United States Patent [19]
Steiner

[11] Patent Number: 5,848,860
[45] Date of Patent: Dec. 15, 1998

[54] AUTOMATIC BACK AND FRONT SPOTFACING AND COUNTERBORING TOOLS

[75] Inventor: Rudolph Steiner, Fairport, N.Y.

[73] Assignee: R. Steiner Technologies, Inc., Fairport, N.Y.

[21] Appl. No.: 953,453

[22] Filed: Oct. 17, 1997

[51] Int. Cl.⁶ .................................................. B23B 51/00
[52] U.S. Cl. .......................................... 408/159; 408/180
[58] Field of Search ................................ 408/57, 93, 153, 408/159, 173, 178, 180, 187, 188, 152

[56] References Cited

U.S. PATENT DOCUMENTS

| | | | |
|---|---|---|---|
| 963,596 | 7/1910 | Lescure | 408/159 |
| 2,404,027 | 7/1946 | Belanger | 408/159 |
| 3,806,271 | 4/1974 | Ishiguro et al. | 408/159 |
| 3,827,821 | 8/1974 | Swenson | 408/180 |
| 4,043,695 | 8/1977 | Gottelt | 408/159 |
| 4,307,636 | 12/1981 | Lacey | 408/159 |

*Primary Examiner*—Daniel W. Howell
*Attorney, Agent, or Firm*—Shlesinger, Fitzsimmons & Shlesinger

[57] ABSTRACT

A cylindrical tool body is chucked at one end in a drive spindle, and has in its opposite end a cutter blade pivotal into and out of a recess in the tool body between inoperative and operative positions, respectively. The pivoted end the cutter has thereon spaced teeth drivingly engaged with the teeth of a rack formed on one end of an elongate operating rod which reciprocates in an axial bore in the tool body. The opposite end of the rod is secured to one end of a radial pin, the opposite end of which projects slidably into a helical groove formed in the inner peripheral surface of an actuating ring which surrounds the tool body adjacent its chucked end. A friction ring which is rotatable on the tool body adjacent the actuating ring is frictionally engaged with the actuating ring by a friction clutch device which also surrounds the tool body adjacent the friction ring. When the friction ring is secured against rotation, and the rotation of the tool body is reversed by the drive spindle, the tool body momentarily rotates relative to the actuating ring, thus causing the helical groove to shift the radial cutter actuating pin slightly axially in the tool body thereby causing the cutter actuating rod slightly axially so that its rack pivots the cutter blade from one end to the other of its limit positions. In a second embodiment two cutter blades are pivotally mounted in a recess in the tool body for operation by two separate operating rods, each of which carries a radial actuating pin which projects into the helical groove formed in the inner peripheral surface of the actuator ring.

15 Claims, 4 Drawing Sheets

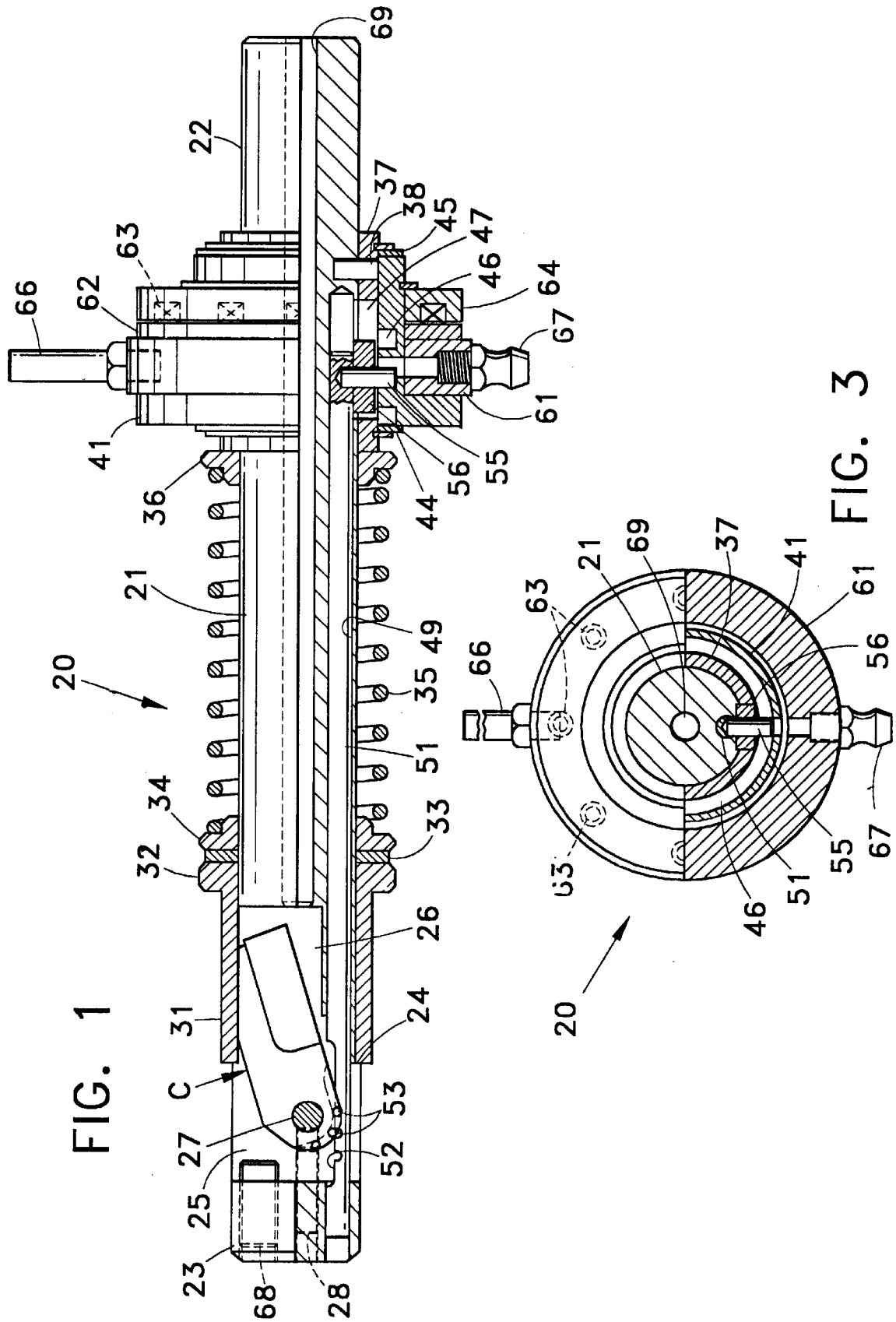

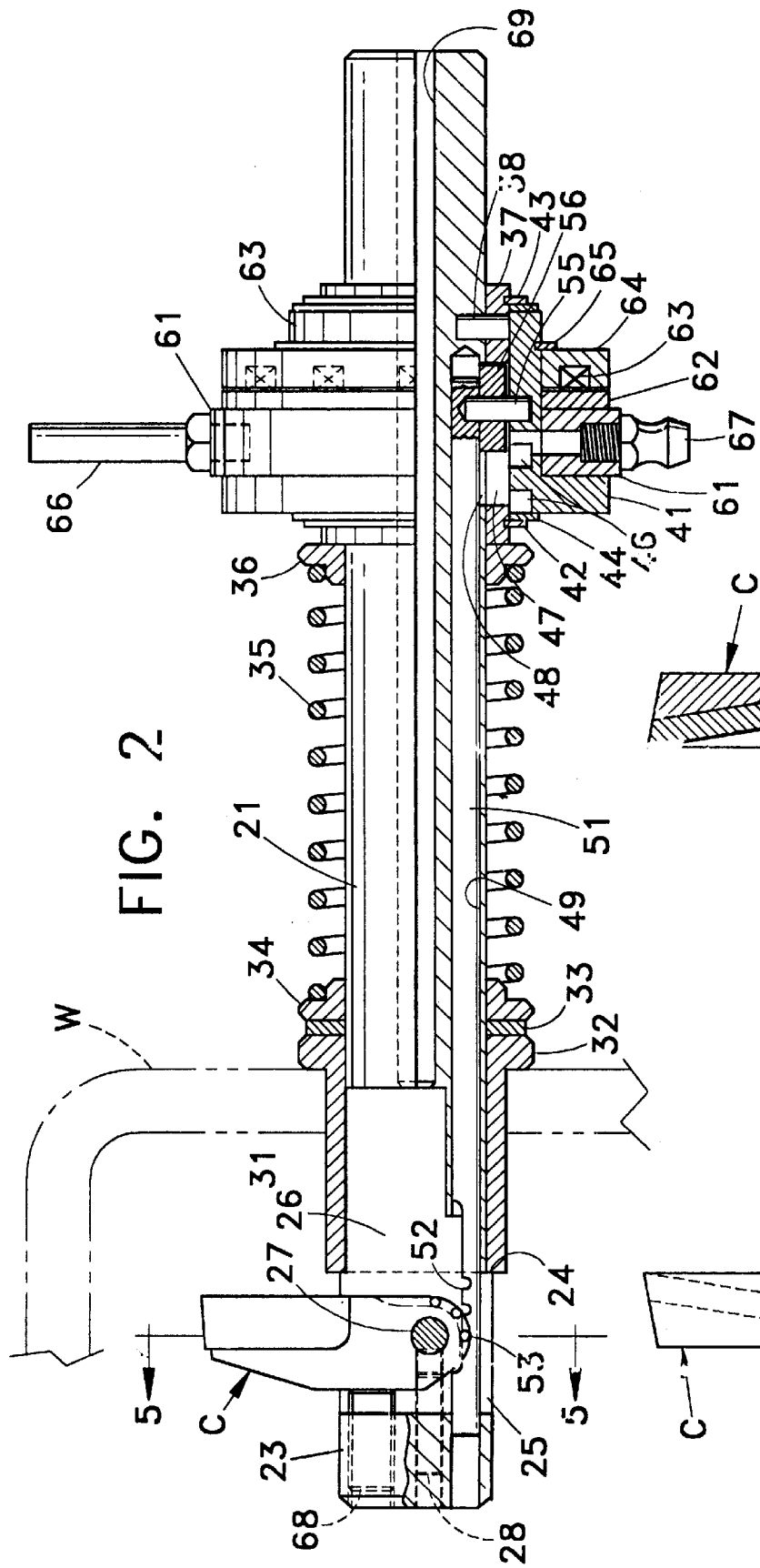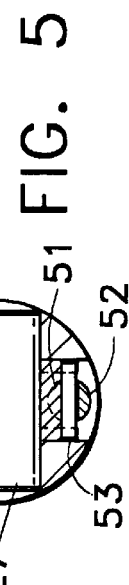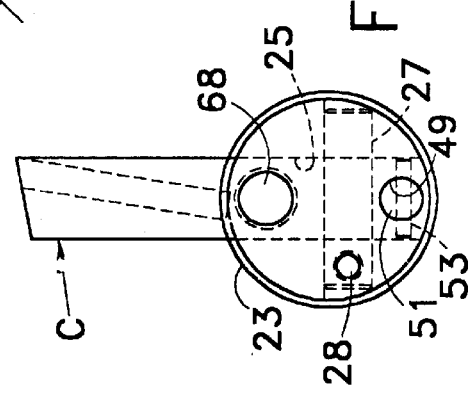

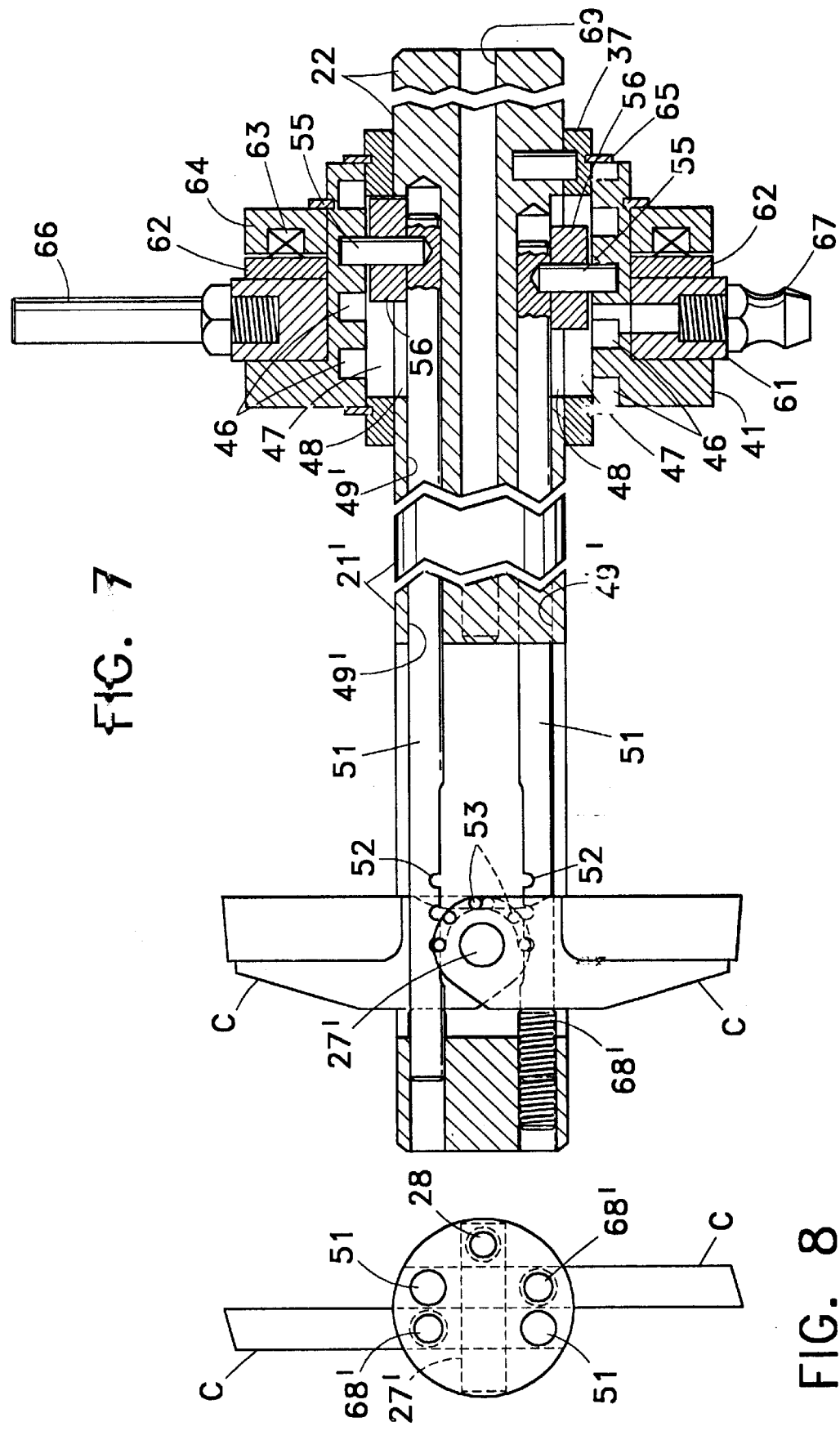

AUTOMATIC BACK AND FRONT SPOTFACING AND COUNTERBORING TOOLS

BACKGROUND OF THE INVENTION

This invention relates to spotfacing and counterboring tools, and more particularly to improved such tools which have cutter bits or blades mounted therein for automatic movement between active and inactive positions. Even more particularly this invention relates to a tool of the type described in which one or two cutter blades are pivotally mounted in the body of a rotatable boring tool for positive movement between inoperative or retracted positions in which they are seated within a recess in the tool body, and operative positions which they project radially from such recess.

It heretofore has been customary in the case of many spotfacing and counterboring tools to employ a cutter blade which is pivotal into and out of a recess in the body of the tool between inoperative and operative positions, respectively. U.S. Pat. No. 4,729,699, for example, discloses a spotfacing tool which requires a portion of the tool to be engaged against the face of the work which is to be spotfaced in order to cause a cutter element or blade in the tool to be swung from an inoperative position within a recess in the tool, to an operative position which the cutter projects radially from the tool. U.S. Pat. No. 3,019,712, U.S. Pat. No. 3,806,271 and U.S. Pat. No. 4,475,852 likewise disclose tools in which the cutter elements are moved between active and inactive positions by virtue of engagement of a thrust element on the tool with the surface of the work that is to be machined. In my pending U.S. application Ser. No. 08/775, 576 this operation is effected by a flywheel, while in U.S. Pat. No. 3,572,182 the manipulation of the cutter blade is effected pneumatically by a supply of compressed air.

Among the disadvantages of prior such tools of the type described is the fact that the apparatus from maniupulating the cutter blade of the tool does not function satisfactorily enough to permit very accurate location of its cutting edge when the cutting element is shifted to its operative position. Moreover, such means for manipulating the cutter blade has heretofore been rather cumbersome and not readily adaptable for automatic operation. Also, such tools have not been capable of being produced short enough to make them suitable for use with modern vertical CNC machinery centers.

Accordingly, it is an object of this invention to provide an improved spotfacing and counterboring tool which is particularly suitable for use with modern CNC machinery equipment, and which can be readily adapted to perform either front or back spotfacing operations, as well as counterboring operations.

Still another object of this invention is to provide an improved tool of the type described which includes one or two cutting elements or blades which can be automatically pivoted into and out of a cutter accommodating recess in the body of the associated tool simply by reversing the direction of rotation of the tool.

Another object of this invention is to provide an improved tool of the type described which includes means for releasably securing one or two cutting elements in the tool body to allow ready replacement of a respective cutting element without removal of the entire tool assembly from its associated machine.

A further object of this invention is to provide means for adjustably positioning a cutter element of a tool of the type described, when the cutter element has been swung to its active, cutting position.

Other objects of the invention will be apparent hereinafter from the specification and from the recital of the appended claims, particularly when read in conjunction with the accompanying drawings.

SUMMARY OF THE INVENTION

The tool comprises a cylindrical body disposed to be secured at one end in and rotated by an associated machine spindle. Adjacent its opposite end the tool body has therein a slot which opens on one diametral side of the body and which contains a pivot pin that extends transversely across the slot adjacent one end thereof. Mounted adjacent one end thereof on the pin to pivot in and out of the slot is a conventional cutter blade which is drivingly connected adjacent its inner pivoted end, to one end of an elongate cutter operating rod that is mounted for limited reciprocation in an axial bore formed in the tool body in radially spaced, parallel relation to its axial centerline. Adjacent its opposite end the operating rod carries a cutter activating pin which projects radially from the rod through registering, axial slots formed in the tool body and a surrounding sleeve that is fixed to the body, and slidably into a helical groove formed in the inner peripheral surface of an activator ring that surrounds the sleeve. A friction ring which also surrounds the sleeve and is disposed to be fixed to the machine to prevent rotation thereof with the tool, is engaged slidably at one side with the activating ring, and its opposite side with a spring-loaded pressure disc.

When the spindle rotates the tool body in one direction and the friction ring is held against rotation, the tool body briefly rotates relative to the activator ring, so that the end of the activator pin, which slides in the helical groove, initially is shifted slightly axially in the registering slots in the activator ring and sleeve, thereby causing the operating rod to be shifted axially from one limit position to the other, thereby to effect pivotal movement of the cutter into or out of the recess in the cutter body. When the spindle rotation is reversed, the activator pin is caused to slide in the helical path in the activator ring in the opposite direction, thereby shifting the cutter operating rod slightly axially back to its other limit position in which the cutter element is correspondingly swung back to its original position.

In one embodiment a rotary, spring-loaded pilot surrounds the cutter body normally to close the cutter accommodating slot. To uncover the slot the rotary pilot is advanced axially by the associated operating spindle until a collar on the pilot engages the outer surface of the work around the bore that is to be spotfaced or counterbored, thereby causing the rotary pilot to be shifted axially in a direction to uncover the slot so that the cutter can be swung into or out of the slot in the tool body. In another embodiment two tool cutter elements are mounted in a slot in the tool body and are operated by two separate, reciprocable cutter operating rods which carry activator pins that seat in the helical operating groove of the actuator ring for sliding movement in the helical recess at diametrally opposite sides of the tool body. In one such embodiment the cutter element faces in a direction to effect back spotfacing, and in another embodiment the cutter element is mounted to face in a direction to perform front spotfacing when in its operative position.

THE DRAWINGS

FIG. 1 is a longitudinal elevational view of a spotfacing and counterboring tool made according to one embodiment of this invention, portions of the tool being cut away and shown in section, and the pivotally mounted cutter element of the tool being shown in its retracted or inoperative position;

FIG. 2 is a longitudinal elevational view of this tool generally similar to that shown in FIG. 1, but illustrating the pivotal cutter element as it appears when it is advanced or shifted to its open, cutting position;

FIG. 3 is an end view of this tool as seen when looking at the right end of the tool as shown in FIG. 1;

FIG. 4 is a slightly enlarged end view of this tool as seen when looking at the left end of the tool as shown in FIG. 2, and illustrating the cutting element in its advanced or operative position;

FIG. 5 is a slightly enlarged, sectional view of this tool taken along the line 5—5 in FIG. 2 looking in the direction of the arrows;

FIG. 7 is a fragmentary sectional view of this modified tool, but with its two cutting elements being shown as they appear when in their advanced or cutting positions;

FIG. 8 is an end view of this modified tool as seen when looking at the left end of the tool as shown in FIG. 7;

DETAILED DESCRIPTION OF THE PREFERRED EMBODIMENTS

Figure 6:
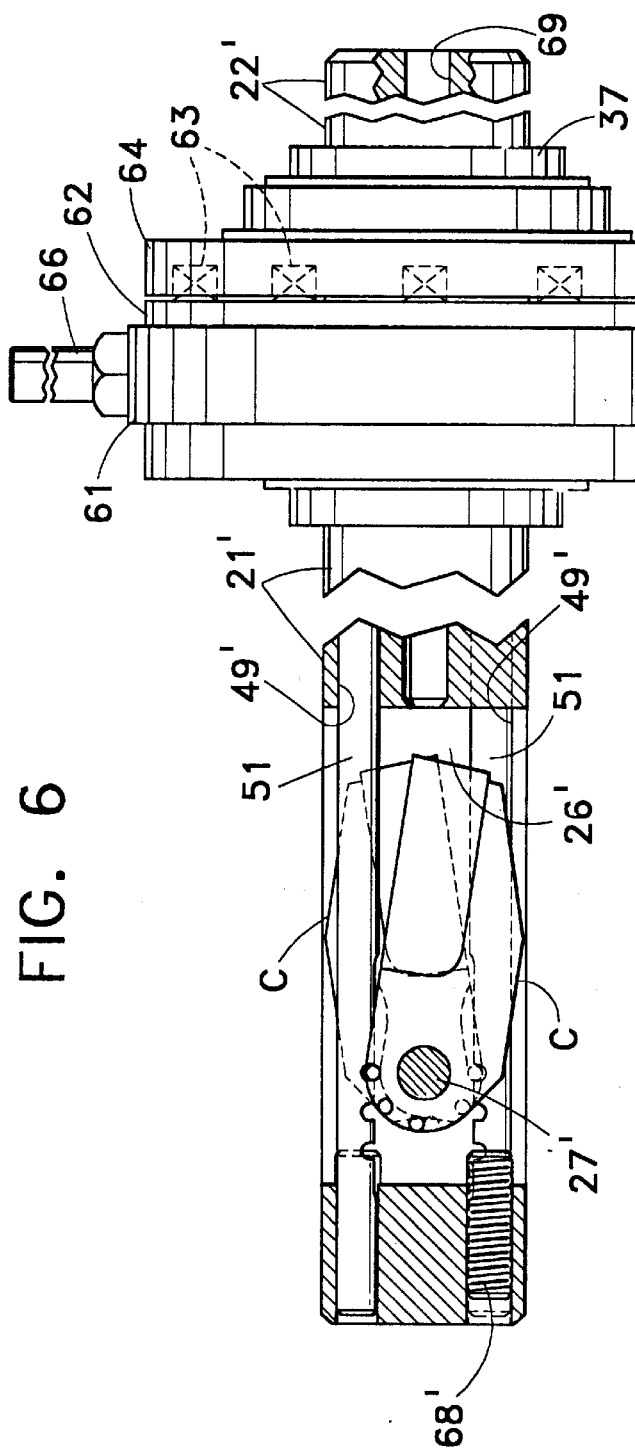
FIG. 6 is a fragmentary longitudinal elevational view, partially in section, of a modified spotfacing and counterboring tool made according to a second embodiment of this invention, the tool including two, pivotal cutter elements shown as they appear when they have been retracted into their inoperative positions within the tool body.

Referring now to the embodiment shown in FIGS. 1 to 5, 20 denotes generally a spotfacing and counterboring tool comprising a cylindrical tool body 21 having at one end thereof a shank section 22 which is adapted to be secured in the driving spindle or arbor of a drill press or the like, and which has formed on its opposite end (the left end in FIG. 1) a slightly enlarged-diameter section 23, which at its inner end forms a circumferential shoulder 24 on the body 21. Section 23 has therethrough a transversely extending slot 25, which is generally rectangular in cross-section, and which at one side thereof (the right side as shown in FIGS. 1 and 2) registers with and opens upon one end of another rectangularly-shaped, and axially extending slot or groove 26, which extends radially inwardly from the outer peripheral surface of the body 21, and partway through the body centrally of its axis. A conventional cutter element C is pivotally mounted at one end thereof on a pivot pin 27, which is removably seated at opposite ends thereof in registering openings formed in the body section 23 at opposite sides of the slot 25, so that the pin 27 extends between and at right angles to the opposed sides of slot 25 adjacent the axis of the holder 21. A lock screw 28 is threaded in an opening in section 23 to engage and releasably secure pin 27 in the tool body 21.

When the cutter C is in its retracted position as shown in FIG. 1, the open side of its slot 26 is closed by a tubular, rotary pilot 31 mounted coaxially on the holder 21 for axial movement into and out of an advanced position in which one end thereof (the left end as shown in FIGS. 1 and 2) is seated against the shoulder 24 on the body 21. At its opposite end the rotary pilot 31 has thereon a integral, enlarged-diameter circumferential shoulder or flange 32, which is seated against an annular thrust bearing 33 that is interposed between the pilot flange 32 and a ring-shaped spring support 34. Support 34 is axially slidable on the tool body 21 with one side thereof engaging the thrust bearing 33, and with the other side thereof engaged by one end of a coiled compression spring 35, which surrounds the tool body 21 intermediate its ends. At its opposite end spring 35 engages another ring-shaped spring support 36, which is seated against one end of an activator sleeve 37 that surrounds and is releasably secured to the tool body 21 coaxially thereof by a connector pin 38. Pin 38 is secured at one end in a radial opening in the outer periphery of the tool body 21, and is seated at its opposite end in a registering, radial opening formed in sleeve 37. Sleeve 37 is secured by pin 38 to the tool body 21 after the rotary pilot 31, spring 35 and its supports 34 and 36 are mounted on the tool body 21.

Rotatably mounted on the activator sleeve 37 coaxially thereof is a tool bit or cutter activator ring 41. Ring 41 is held against axial movement relative to the activator sleeve 37 by retaining rings 42 and 43, which are secured coaxially in the outer peripheral surface of sleeve 37 adjacent opposite ends thereof, and which project radially outwardly from sleeve 37 and into engagement with thrust rings 44 and 45, respectively, which surround sleeve 37 and which are engaged with opposite ends, respectively, of the activator ring 41. Ring 41 has in its inner peripheral surface a helical groove 46 which surrounds the activator sleeve 37, and axially aligned portions of which register with an elongate, axially extending slot 47 which is formed in the activator sleeve 37 intermediate its ends. Slot 47 communicates through a registering, axially extending slot 48 in the tool body 21 with one end of an elongate, axially extending bore 49 formed in the tool body to extend partway longitudinally thereof from its enlarged diameter end 23 toward its shank end 22, and in spaced, parallel relation to the axial centerline of the body.

Mounted for limited axial movement in the bore 49 is an elongate, cylindrical cutter operating rod 51 which has formed in one diametral side thereof adjacent its outer end (the left end in FIGS. 1 and 2) a rack 52 in the form of a plurality of axially spaced, transversely extending notches or recesses forming spaced teeth (two in the embodiment illustrated) which extend transversely across rod 51. These teeth have meshing, driving engagement with a plurality (three in the embodiment illustrated) of angularly-spaced pins 53, which are secured in the end of the cutter 31 remote from its cutting end to extend transversely across an arcuate groove or slot formed in the pivoted end of the cutter. Adjacent its opposite end the rod 51 has secured in a radial opening therein one end of a radially extending activating pin 55, which is secured intermediate its ends in a rectangular pin retainer 56 that is mounted for axial sliding movement in registering slots 47 and 48 in the sleeve 37 and the tool body 21, respectively. At its opposite end activating pin 55 extends slidably into a helical activating groove that is formed in the inner peripheral surface of activator ring 41.

At its end remote from the compression spring 35, the activator ring 41 has thereon a reduced-diameter section surrounded by rotatable friction ring 61, one side of which is seated against the enlarged-diameter end of the ring 41. Also surrounding sleeve 37 coaxially thereof is a circular pressure disc 62, one end of which is seated against the side of the friction ring 61 remote from the enlarged end of the activator ring 41. The opposite side of ring 61 is engaged by a plurality of compression springs 63, which are seated in registering, angularly spaced recesses formed in a circular spring retainer 64 that is secured on the reduced-diameter section of activator 41 by a retainer ring 65. With this construction the compression springs 63 urge the pressure disc 62 into frictional engagement with one side of the friction ring 61, so that upon reversal of the direction of rotation of the tool body 21, the friction disc 62 momentarily prevents the actuating ring 41 from rotating with the body 21, and thereby causes pin 55 to slide in the helical groove 46 in ring 41, and axially in slots 47 and 48.

Secured at one end in a recess at the outer periphery of the friction ring 61 is a torque rod 66, which as noted hereinafter, is disposed to be fixed to a non-rotating part of an associated machine in order to secure the friction ring against rotation during operation of the equipment. Secured at one end thereof in another radial opening formed in the outer periphery of the friction ring 61 at a point almost diametrically opposite the torque rod 66, is a grease fitting 67, the bore of which communicates through registering openings in the ring 61 and the reduced-diameter section of ring 41 with the helical groove 46 in slots 47 and 48 in order to provide lubricant for the cutter operating rod 51. Threaded into an internally-threaded bore formed in the enlarged diameter section 23 of the holder 21 is a cutter blade leveling screw 68, the inner end of which extends into slot 25, and is disposed to engage one edge of the cutter element C, when the latter is swung to its operative or cutting position or shown in FIG. 2, thereby to prevent any further, undesirable counterclockwise rotation of the cutter C about the pin 27 from its position as shown in FIG. 2. Also, the tool body 21 has therethrough an axial, central bore 69, which opens at one end on the outer end of shank 22, and at its opposite end on slot 26 for use in supplying a coolant to cutter C during its use.

At the outset of an operation, and with the cutter element C pivoted into its closed position as shown in FIG. 1, the spindle of the associated tool operating mechanism (not illustrated) is advanced in a conventional manner to insert the cutter bearing section 23 of the tool body 20 through an opening in the wall of a workpiece W (shown in phantom by broken lines in FIG. 2) until the cutter bearing end has been inserted into the interior of the work W, and the collar 32 on the rotary pilot 31 has engaged the outer surface of the work W. Thereafter, as a spindle of the operating machine is advanced still further, the work W prevents further advancement of the pilot 31 and causes the spring 35 to be compressed until the cutter accommodating opening or slot 26 in the tool body 21 has been advanced beyond the left, open end of the pilot 31. At this stage, when the slot 26 has been advanced beyond the adjacent end of the pilot 31, and assuming by way of example that the machine spindle has been rotating the tool body 21 in a clockwise direction in FIG. 3 relative to the fixed or stationary friction ring 62, then the activating pin 55 will be in the position as shown in FIG. 1. At this time also the spring retainer 64, its springs 63 and the pressure disc 62 will be rotating likewise in a clockwise direction and will have sliding engagement with one side of the stationary ring 62; and the activator ring 41 will also be rotating in a clockwise direction its slot 46 having shifted the pin 55 axially toward the left to its cutter closing position as shown in FIG. 1. Further movement of the pin 55 in this direction will have been prevented by virtue of the fact that the cutter activating rod 51 is in its extreme left hand position, as shown in FIG. 1, wherein cutter C is fully collapsed within the recess 26, and further axial movement of the pin 51 toward the left in FIG. 1 is thereby prevented. The clockwise rotation of the activator ring 41 tends merely to retain the rod 51 in its cutter closing or retracting position.

After the cutter bearing end of the body 21 has been advanced far enough beyond the pilot 31 to open the slot 26, the rotation of the driving spindle is suddenly reversed, thereby causing the cutter body 21 suddenly to be rotated in its opposite direction, or counterclockwise in FIG. 3. This sudden change in direction of rotation of the tool body 21 momentarily causes body 21 to be rotated relative to the ring 41, thereby causing the end of the activator pin 55, which is seated in the helical groove in the activator ring 41, to be shifted axially toward the right from its position as shown in FIG. 1, thereby shifting the activating rod 51 axially toward the right from its position in FIG. 1 to its other limit position as shown in FIG. 2. This axial movement of rod 51, via its rack 52 and pins 53 on the cutter C, causes the cutter to be swung outwardly to its active or cutting position as shown in FIG. 2. As soon as the cutter C has engaged the inner end of its leveling screw 68, further axial movement of the rod 51 is prevented, and activator pin 55 thus stops in the position shown in FIG. 2. Thereafter the helical groove 46 in the rotating activator ring 41 continues to maintain pin 55 in this position, and therefore continues to retain cutter C in its fully open position. The operating spindle can then be retracted to cause the cutting edge of the now advanced cutter C to be drawn into operative engagement with the inner surface of the work W which is to be back spotfaced or countersunk.

From the foregoing it will be apparent that after the cutting operation has been completed, the cutter C can be retracted into its inoperative position by reversing the procedures described above. For example the spindle can once again be advanced to engage the collar 32 of the pilot 31 against the outer surface of the work W, and after the cutter bearing end of the body 21 has been further advanced into the opening in the work W, the rotation of the spindle can be reversed to cause the the pin 55 to be shifted back to its position as shown in FIG. 5. In so doing, pin 55 causes the rod 51 to pivot the cutter C back into its retracted position, after which retraction of the spindle will cause the compression spring 35 to return the pilot 31 to return to its cutter enclosing position as shown in FIG. 1.

Referring now to the embodiment shown in FIGS. 6 to 8, wherein like numerals are employed to denote elements similar to those employed in the first embodiment, 21' denotes a modified tool body having mounted thereon adjacent its shank end 21' cutter operating elements 37, 41 and 61–65 of the type employed in the first embodiment. Body 21' has therein two elongate, spaced, parallel, axially extending bores 49' in each of which is slidably mounted on one of the elongate cutter operating rods 51. Each rod 51 extends at one end thereof (the left end as shown in FIG. 6) into a large cutter accommodating slot 26' formed through the body section 21' adjacent the cutter bearing end thereof. As in the first embodiment, each operating rod 51 has formed on its outer end a rack section 52 which is drivingly connected to pins 53 carried in one end of each of two separate cutter elements C. Each cutter C is mounted at said one end thereof on a common pivot pin 27' which extends transversely across one end of the cutter accommodating slot 26', and which is removably secured in the body section 21' by a pivot pin lock screw 28. As shown more clearly in FIG. 8, the two cutters C are mounted at their inner ends on the pin 27 to pivot adjacent to each other, and selectively into and out of diametrally opposite sides of the slot 26' between retracted, inoperative positions as shown in FIG. 6, to operative or cutting positions as shown in FIG. 7 in which case each cutter C extends transversely outwardly beyond the body section 21' at opposite sides of the slot 26'. In their operative position, the cutters C are engaged at one side thereof (the left side as shown in FIG. 7) with cutter blade leveling screws 68', which like the screw 68 in the first embodiment limit the outward pivotal movements of the cutters.

At its inner end each operating rod 51 of this embodiment registers with one of two pairs of registering slots 47 and 48 formed in diametrally opposite sides of sleeve 37 and body section 21', respectively, and has projecting radially therefrom an activating pin 55 similar to that employed in the first embodiment. Each pin 55 is secured intermediate its ends in a rectangular pin retainer 56, which is mounted for limited axial reciprocation in one of the pair of registering slots 47 and 48, and extends into the internal helical groove 46 of the activator ring 41 at one diametral side thereof. With this construction, when the two cutters C have been shifted to their operative positions as shown in FIG. 7, one of the two activator pins 55 will have been shifted axially further away from its associated cutter C than has been the other activator pin 55 with respect to its cutter C. In other words, the activator pins 55 are slightly offset axially from each other in the helical recess 46, so that when the pins 55 are subsequently shifted axially toward their associated cutter elements C to swing the cutters into their closed or inoperative positions (FIG. 6), both pins 55 will be shifted axially the same distance, but will maintain a slight axial spacing relative to each other.

In use, the two cutters C shown in the second embodiment will be shifted simultaneously to and from their respective inoperative and operative positions in response to reversal of rotation of the body section 21', assuming the friction ring 61 has been secured against rotation. Since the tool in this embodiment does not employ a rotary pilot of the type denoted at 31 in the first embodiment, the associated drive spindle need only to pass the cutter bearing end of the body section 21' through an opening in a piece of work far enough to place slot 26' and the retracted cutter C beyond the side of the work which is to be back spotfaced. Once the cutter bearing end of the tool has been passed through the opening in the work, the rotation of the spindle may be suddenly reversed, and will cause pins 55 to be shifted into the positions as shown in FIG. 7, thus swinging the cutters C to their open or operative positions. Whenever it is desired to return the cutters to their closed or inoperative positions, the direction or rotation of the drive spindle is once again reversed, which will thereby cause the pins 55 to be shifted slightly toward the left from their positions as shown in FIG. 7, and for a distance far enough to cause the racks 52 to swing the cutters back to their closed positions as shown in FIG. 6.

Figure 9:
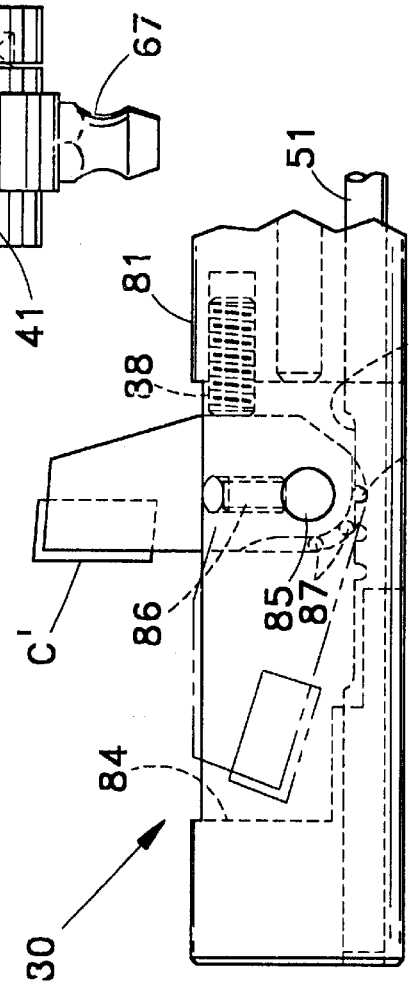
FIG. 9 is a fragmentary, longitudinal elevational view of a still further modification of this invention illustrating a front spotfacing tool element as its appears when mounted in the body of the tool of the type generally similar to that shown in FIG. 6.
Figure 10:
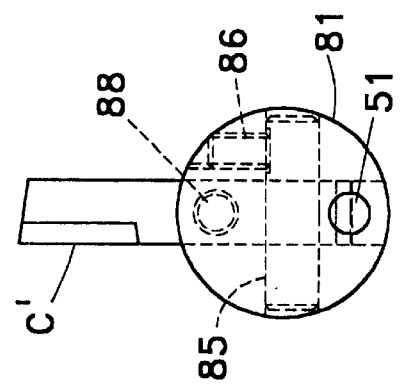
FIG. 10 is an end view of this modified tool as seen when looking at the left end of the tool as shown in FIG. 9.

The tools disclosed in the two foregoing embodiments have been described in connection with cutters which are designed primarily to effect back spotfacing or counterboring. However, depending simply upon the positioning of the cutter element in a respective tool body, the cutter can be designed to perform front spotfacing. As shown for example in the embodiment disclosed in FIGS. 9 and 10, wherein like numerals are again employed to denote elements similar to those employed in the preceding embodiments, 80 denotes generally a front spotfacing and counterboring tool comprising a tool body section 81 having mounted for axial sliding movement therein a cutter operating rod 51 of the type previously described. Since this rod 51 is adapted to be actuated by an activator ring 41 and associated apparatus of the type disclosed in connection with the first embodiment, such apparatus will not be illustrated and described in detail in connection with the embodiment shown in FIGS. 9 and 10. As in the first embodiment, the cutter operating rod 51 has formed at its outer end, as shown in FIG. 9, a rack 52 which extends into an elongate notch or recess 84 formed in the end of the body section 81 remote from the mechanism which operates rod 51. A cutter C' is mounted at one end thereof to pivot on a pivot pin 85 seated at opposite ends thereof in the body section 81 adjacent opposite sides of the slot 84, and releasably secured in section 81 by a pivot pin lock screw 86. As in the case of the preceding embodiments, the pivoted end of the cutter C' has mounted therein a plurality of, at least two, pins 87 which are disposed to be engageable drivingly with the rack 52 on the rod 51.

Contrary to the preceding embodiments, the cutter element C' is disposed to be pivoted about its pivot pin 85 in a clockwise direction by the rod 51 in order to have the cutter C' swung to its outer or operative position. In such position the cutter C', remote from its cutting edge, engages the outer end of a cutter blade leveling screw 88, which projects from, and is adjustably threaded into a recess formed at the inner end of slot 84. Screw 88 thus limits the clockwise pivotal movement of the cutter C'. On the other hand, when the rod 51 is shifted axially toward the right from its position as shown in FIG. 9, the teeth of its rack 52 engage the pins 87 and cause the cutter C' to be swung counterclockwise into its retracted position in which it is seated, or nearly fully seated, in the slot 84 in the body section 81. As noted above, this pivotal movement of the cutter C' will be effected in response to the reciprocation of rod 51 by an activator ring of the type denoted at 41 in the preceding embodiments. In this embodiment the cutting edge of the cutter C' faces in the direction of the cutter bearing end of the tool, and thus functions as a front spotfacing or counterboring tool.

From the foregoing it will be apparent that the present invention provides a heavy duty, automatically operated back or front spotfacing and counterboring tool capable of providing an unlimited counterbore diameter ratio, and particularly suitable for use with modern CNC machining equipment. In this connection it will be noted that the tool has a cutter body section (21, 21', 81) that is an integral part of the tool shank, and the tool body section can be made smaller than the cutting end of the tool in which case it can be provided with a rotary bearing pilot 31. Alternatively the pilot can be eliminated enabling the body section to remain equal to or larger than the cutting end and shank of the tool. Moreover the tool can be built with one or two cutter blades mounted on the pivot pin adjacent the cutting end of the body section. In the embodiment having two cutter blades, separate activating rods can be manipulated by a common activator ring to effect simultaneous movement of the two tools between their advanced and retracted positions, respectively; and if desired, two separate helical recesses may be formed in the inner periphery of the associated actuating ring 41 each to manipulate one of the pins 55. In each case the tool is activated simply by effecting reversal of the spindle drive thereby eliminating wasted motions during the machine cycle. Moreover, each cutter element or blade is fully supported in its tool body against both radial and axial cutting forces; can be replaced rapidly and easily without removing the entire tool assembly from the machine spindle.

While this invention has been illustrated and described in detail in connection with only certain embodiments thereof, it will be apparent that it is capable of still further modification, and that this application is intended to cover any such modifications as may fall within the scope of one skilled in the art, or the appended claims.

I claim:

1. A spotfacing and counterboring tool comprising an elongate tool body having on one end a shank for attachment to and for rotation selectively in opposite directions by a machine tool spindle, a cutter blade pivotally mounted adjacent one end thereof in a recess in the opposite end of said tool body for pivotal movement between an inoperative position within said recess and an operative position in which the opposite end of the blade projects out of said recess at one side of said body, an operating member mounted for reciprocation in an axial bore in said body between first and second limit positions, and extending at one end thereof into said recess, means drivingly connecting said one end of said operating member to said one end of said blade, whereby reciprocation of said member between its two limit positions effects pivotal movement of said blade between its operative and inoperative positions, respectively, an actuating ring surrounding said tool body adjacent said shank and having in its inner peripheral surface an operating recess extending between opposite ends of said ring, and means connecting said tool body to said ring for rotation therewith, and for limited rotation relative to said ring each time the rotation of said tool body is reversed, said means including an actuator element secured at one end to said operating member for reciprocation therewith, and slidably seated at its opposite end in said operating recess in said ring, and said operating recess in said actuating ring being operative during the rotation of said tool body relative to said ring, to cause said actuator element to shift the attached operating member axially from one to the other of its limit positions.

2. A tool as defined in claim 1, wherein said recess in said actuating ring is a helical groove formed in said inner peripheral surface of said ring coaxially thereof and surrounding said tool body.

3. A tool as defined in claim 1, wherein said actuator element comprises a pin secured at one end to said operating member and projecting at its opposite end through a registering slot in said tool body and slidably into said operating recess in said ring.

4. A tool as defined in claim 1, wherein said recess opens on opposite sides of said tool body, a second operating member is mounted to reciprocate between first and second limit positions in a second axial bore formed in said tool body in spaced, parallel relation to the first-named bore, and extends at one end thereof into said recess in said tool body, a second cutter blade is pivotally mounted adjacent one end thereof in said recess for pivotal movement adjacent the first-named cutter blade and into and out of an operative position in which the opposite end thereof projects from the opposite side of said tool body, and said means further includes another actuator element secured at one end to said second operating member and slidably seated at its opposite end in said operating recess in said ring, thereby to effect axial movement of said second operating member from one to the other of its limit positions upon rotation of said tool body relative to said ring.

5. A tool as defined in claim 1, including a pilot sleeve mounted for axial sliding movement on said tool body adjacent said recess, a spring surrounding said body between said pilot sleeve and said actuating ring and operative normally to urge said sleeve axially on said body to a first limit position in which one end of said sleeve overlies and closes a portion of said recess, and an integral collar on said sleeve adjacent the opposite end thereof and disposed, when said pilot sleeve enters the bore in a piece of work that is to be machined, to be engaged and urged by the work rearwardly on said body against the resistance of said spring, and thereby causing said sleeve to open the previously closed portion of said recess.

6. A tool as defined in claim 1, wherein said cutter blade has a cutting edge on one side thereof, and a screw is adjustably threaded in an axial bore in said opposite end of said tool body and projects at one end thereof into said recess to engage the opposite side of said blade when said blade is in its operative position.

7. A tool as defined in claim 1, including a pivot pin extending transversely across said recess in said tool body and through a registering opening in said cutter blade, thereby to support said blade for pivotal movement on said pivot pin, and means removably securing said pivot pin adjacent one end thereof in said tool body.

8. A tool as defined in claim 1, wherein said tool body has therethrough a second axial bore spaced from and extending parallel to the first-named bore, and opening at one end thereof on said recess for conveying a coolant to said cutter blade.

9. A tool as defined in claim 1, wherein said means connecting said tool body to said ring further includes a pin retainer axially slidable in a slot formed in said tool body to extend parallel to and to open at one end upon said axial bore in said body, and said actuator element comprises a pin secured intermediate its ends in said retainer, and being fixed at one end to said operating member, and extending at its opposite end slidably into said operating recess in said actuating ring.

10. A tool as defined in claim 9, wherein said operating recess extends in a helical path between opposite ends of said ring.

11. In a spotfacing and counterboring tool having a cylindrical tool body with a shank on one end thereof for attachment to and for rotation selectively in opposite directions by a machine spindle, and with a cutter blade pivotally mounted in a recess in the opposite end thereof for pivotal movement between operative and inoperative positions by an operating rod mounted for limited reciprocation in an axial bore in said body, means for automatically shifting said rod from one to the other of its limit positions each time the direction of rotation of said tool body is reversed, comprising an actuating ring surrounding said tool body adjacent the shank end thereof and having in its inner peripheral surface a recess extending between opposite ends thereof, and connecting means for imparting the rotation of said tool body to said ring, including an actuator element secured at one end to said operating rod to reciprocate therewith and projecting at its opposite end through a slot in said tool body and slidably into said recess in the inner peripheral surface of said ring, said connecting means including means operative each time the direction of rotation of said tool body is reversed momentarily to rotate said tool body relative to said actuating ring, and simultaneously to shift said actuator element and the attached operating rod from one to the other of their limit positions.

12. In a tool as defined in claim 11, a friction ring surrounding said actuating ring coaxially thereof, means for securing said friction ring against rotation during rotation of said tool body, and friction means coupling said actuating ring to said friction ring and operative momentarily to prevent rotation of said actuating ring each time the rotation of said tool body is reversed.

13. In a tool as defined in claim 12, a fitting secured in a radial opening in said friction ring and having therethrough a bore communicating with said recess in said actuating ring for supplying a lubricant thereto.

14. In a tool as defined in claim 11, wherein said recess in said actuating ring extends in a helical path between opposite ends of said ring, and said slot in said tool body extends parallel to said operating rod.

15. In a tool as defined in claim 11, wherein said actuator element comprises a pin secured at one end to said operating rod and slidably seated at its opposite end in said recess in said actuator ring, and a pin retainer is secured to said pin intermediate the ends thereof and is slidably positioned in said slot in said tool body for limited reciprocation between opposite ends of said slot upon reciprocation of said rod.

* * * * *